United States Patent [19]

Balian et al.

[11] Patent Number: 5,520,996
[45] Date of Patent: May 28, 1996

[54] GLAZING PROVIDED WITH A CONDUCTING AND/OR LOW EMISSIVE FUNCTIONAL COATING

[75] Inventors: Pierre Balian, Compiegne; Jean-Francois Oudard, Thiescourt; Georges Zagdoun, La Garenne-Colombes, all of France

[73] Assignee: Saint-Gobain Vitrage, Courbevoie, France

[21] Appl. No.: 356,320

[22] PCT Filed: Apr. 18, 1994

[86] PCT No.: PCT/FR94/00429

§ 371 Date: Feb. 21, 1995

§ 102(e) Date: Feb. 21, 1995

[87] PCT Pub. No.: WO94/25410

PCT Pub. Date: Nov. 10, 1994

[30] Foreign Application Priority Data

Apr. 29, 1993 [FR] France .................... 93 05056

[51] Int. Cl.$^6$ .................................................. B32B 17/06
[52] U.S. Cl. ..................... 428/216; 428/34; 428/428; 428/432; 428/697; 428/698; 428/699; 428/701; 428/702; 52/786.11

[58] Field of Search ................... 428/426, 428, 428/432, 688, 689, 697, 698, 699, 701, 702, 215, 216, 34; 52/788; 427/255.7, 248.1, 449; 204/192.26, 192.27, 192.29; 359/586, 589

[56] References Cited

U.S. PATENT DOCUMENTS

| 4,440,822 | 4/1984 | Gordon | 428/216 |
| 5,318,830 | 6/1994 | Takamatsu | 428/216 |
| 5,342,676 | 8/1994 | Zagdoun | 428/216 |
| 5,387,433 | 2/1995 | Balian | 427/126.3 |

*Primary Examiner*—Ellis P. Robinson
*Assistant Examiner*—Leonidas J. Jones, III
*Attorney, Agent, or Firm*—Oblon, Spivak, McClelland, Maier & Neustadt

[57] ABSTRACT

The invention relates to a glazing comprising a transparent substrate (1), in particular of glass provided with a transparent, conducting and/or low emissive functional coating (3) based on a metal oxide or metal oxides, an "inner" covering (2) of geometrical thickness between 70 and 135 nm and a refractive index between 1.65 and 1.90 positioned between the functional coating (3) and the substrate (1) and an "outer" covering (4) of geometrical thickness between 70 and 110 nm and a refractive index between 1.40 and 1.70 located on the functional coating (3).

10 Claims, 1 Drawing Sheet

GLAZING PROVIDED WITH A CONDUCTING AND/OR LOW EMISSIVE FUNCTIONAL COATING

BACKGROUND OF THE INVENTION

Field of the Invention

The invention relates to a glazing comprising a glass substrate provided with a thin functional coating, the latter having transparency, electrical-conductivity and/or low emissivity properties.

It also relates to processes for obtaining such a glazing, more particularly with the aid of pyrolysis methods or methods using a vacuum.

This type of functional coating is more particularly used for equipping glazings to be used in buildings, coated with a low emissive coating, a glass substrate making it possible to reduce emission in the far infrared through the glazing of which it forms part from the inside to the outside of the room. By reducing energy losses partly due to said radiation escape, there is a significant improvement to the comfort of the persons located therein, particularly in winter. The thus covered substrate can be combined with another substrate by means of a layer of gas, the low emissive coating being located on the inside and in particular face 3 (counting from the outermost face) so as to form a highly effective, insulating double glazing.

These coatings can also be used on glazings to be employed in cars, as a result of their electrical conductivity properties, e.g. for forming heated glazings by providing current intakes.

Coatings of metal oxides having these properties are e.g. coatings of tin-doped indium oxide (ITO), zinc oxide doped with aluminium (ZnO:Al), with indium (ZnO:In), with tin (ZnO:Sn) or with fluorine (ZnO:F) or fluorine-doped tin oxide ($SnO_2$:F).

These metal oxide coatings can be obtained by different processes, such as vacuum processes (thermal evaporation, cathodic sputtering, optionally with the aid of a magnetron) or by the pyrolysis of metalorganic compounds projected by a vector gas in liquid, solid or gaseous form onto the surface of the glass substrate heated to a high temperature, but which is still below its softening point. The latter, contacted with a hot surface, decompose accompanied by oxidation in order to form a metal oxide coating thereon. The latter procedure is particularly advantageous to the extent that it makes it possible to envisage deposits directly on the ribbon of glass of a float-production line in a continuous manner.

However, for said coatings to reach a high performance level, particularly with respect to the emissivity and/or electrical conduction values, their thickness must be at least 180 nm, or beyond 400 nm and is usually between 300 and 450 nm.

However, when a thin coating has such characteristics, it gives the substrate which it coats an appearance in reflection on the "coating side", which may not be very highly appreciated from the esthetic standpoint.

Thus, for example, according to the teaching of EP-B-125 153, a fluorine-doped tin oxide coating $SnO_2$:F, whose limited thickness of 163 to 165 deposited on a 4 mm thick clear float glass substrate gives the latter a colouration in reflection in the blue, which is at present highly appreciated both in the building and car fields.

However, it has been found that a coating of the same nature, but in this case with a thickness of 360 nm, i.e. a coating with better performance characteristics, gives the same substrate an appearance in reflection on the coating side in the red-greenish range, i.e. a colouration which would be considered relatively unpleasing for the eye. Moreover, the coated substrate has a light reflection value $R_L$ on the coating side higher than 10 or 15% and a colour purity associated with said reflection which can exceed 10 to 15%, which means a definitely coloured and reflecting appearance of the substrate on the coating side (i.e. the side which is generally installed in face 3 of a double glazing installed in a building, i.e. that which is seen from the outside on viewing the facade. It is pointed out that the value of the purity indicates the intensity of the colour, the closer it is to 0%, the more it appears "whitewashed" and pastel. Therefore the colour is evaluated relative to the value of the light reflection $R_L$.

However, the present tendency is towards a design of glazings, particularly those intended for buildings, which are not very reflecting, particularly when seen from the outside. The bright, reflecting appearance is even more prejudicial when associated with a not well appreciated tint.

Moreover, even if intrinsically a light reflection $R_L$ of approximately 15% is not great, it still signifies a certain drop in the transmitted solar energy quantity, particularly within the room and therefore reduces by a few percent the solar factor, i.e. the ratio of the sum of the transmitted solar energy and the solar energy absorbed by the glazing and reemitted towards the interior of the room to the incident solar energy. This is an energy disadvantage, particularly when it is wished to incorporate such a substrate into an insulating double glazing with a view to decreasing heating costs.

A first solution to this problem of appearance in reflection is provided by French patent application FR-A-2 684 095, whose teaching is incorporated into the present application. This solution firstly consists of interposing between the substrate and the aforementioned functional coating having a thickness of 200 to 400 mm, a first or inner covering, whose optical thickness is between 50 and 75 nm. On the coating is also provided a second or outer covering, whose optical thickness is approximately ¼ of the average wavelength belonging to the visible range and preferably centred on 550 nm (the optical thickness being the product of the geometrical thickness by the refractive index of the covering in question).

The interest of such a stack is that there are two coverings on either side of the functional coating, which allows fine optimizations of their characteristics, essentially the optical and geometrical thicknesses and refractive index.

Such a combination of appropriately chosen coverings makes it possible to obtain monolithic substrates (e.g. of 4 mm thick float glass) which, once provided with the stack, have a light reflection $R_L$ of at the most 6%, accompanied by a colouration purity in reflection and normal incidence of at the most 3%. It also has an emissivity of at the most 0.2.

Installed in a double glazing in such a way that the coatings are in face 3, the latter has a slightly higher light reflection (but still remaining below 15%) with a colouration purity in reflection reduced still further in normal incidence and at the most 5%, even at the measurement incidence angle normally considered as unfavourable. Its solar factor in normal incidence reaches at least 0.76.

Such $R_L$ values firstly imply a suppression of most of the reflecting effect of the glazing, permitting an overall increase in the value of the energy transmission $T_E$ and therefore the solar factor.

With respect to the colouration purity values in reflection, in association with the $R_L$ values, they give the glazings, no matter whether they are monolithic or installed in double glazings, an only slightly intense coloured appearance, even by choosing an incidence angle which is generally not very favorable and which differs from the normal incidence. Thus, there is a better homogeneity of appearance of the glazings of a building facade seen from the outside.

However, it has not been envisaged to control and select the dominant wavelength in reflection on the "coating side", i.e. choose the colour in reflection, even if it is highly attenuated and whitewashed as a result of the combination of low purity and light reflection.

The aim of the invention is to develop a glazing, which optimizes this type of stack in order to retain all its advantages, whilst also being able to control the choice of colour in reflection, more particularly in order to be able to obtain a colour in reflection on the "coating side" in the blue range, which is considered to be highly desirable at present both in the building field and in the car field as being pleasing to the human eye.

SUMMARY OF THE INVENTION

The glazing according to the invention comprises a transparent and in particular glass substrate provided with a so-called functional coating, which is transparent, conducting and/or low emissive and is based on a metal oxide or metal oxides.

An inner covering is provided between the substrate and the functional coating and preferably has a geometrical thickness between 70 and 135 nm and a refractive index between 1.65 and 1.90.

A second outer covering is placed on the functional coating and preferably has a geometrical thickness between 70 and 110 nm and a refractive index between 1.40 and 1.70.

The functional coating usually has a refractive index close to 2 and a thickness between 300 and 450 nm, preferably between 330 and 410 nm and in particularly approximately 330, 360 or 410 nm.

This novel selection of characteristics regarding the two coverings makes it possible to ensure that a thus covered substrate installed in a double glazing not only has a purity in reflection on the "coating side" equal to or below 5% and a light reflection equal to or below 15%, but also a dominant wavelength of the colour in reflection in the blue and in particular between 465 and 480 nm. These three factors are combined in order to give the glazing a very favourable appearance in reflection, because it is both reflecting and a very desirable and not very intense colour.

Thus, in a highly surprising manner, a glazing can be blue in reflection when covered with a functional coating having a thickness which, when said coating is used alone, corresponds to a completely different tint. This choice of dominant wavelength obtained by the combination of two highly specific coverings is not detrimental to the reflection and purity values, which remain very low, which is highly advantageous.

DESCRIPTION OF THE PREFERRED EMBODIMENTS

Figure 1:
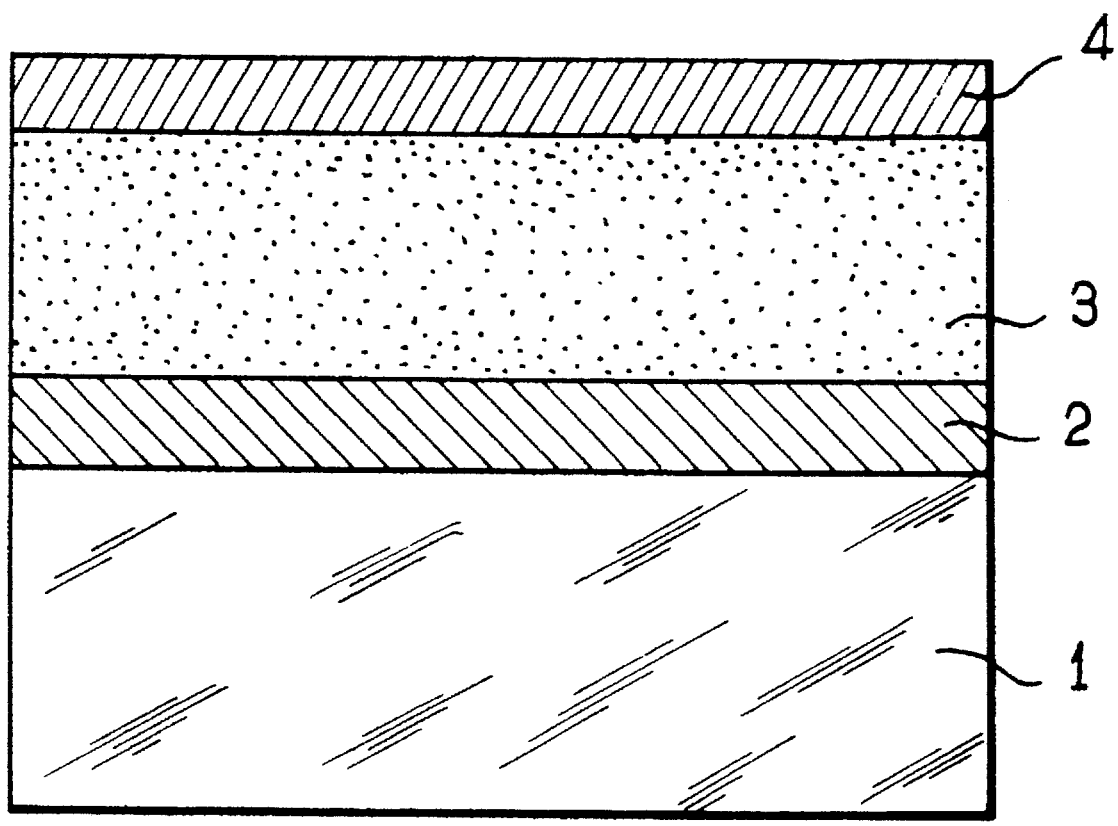

Two types of inner covering are particularly appropriate and are in particular based on silicon, oxygen and carbon (Si, O, C) and/or based on silicon, oxygen and nitrogen (Si, O, N) and preferably obtained by the pyrolysis of silicon-containing precursors, particularly by chemical vapour deposition (CVD), as disclosed by FR-A-2 677 639, or by plasma CVD, as disclosed in EP-A-413 617.

However, the inner covering can also be constituted by a mixture of metal oxides, whose relative proportion makes it possible to adjust the desired refractive index. These oxides are in particular chosen from within the following group: aluminium oxide, titanium oxide, tin oxide, zinc oxide and indium oxide, as stated in French patent application FR-A-2 670 199.

Preference is given to the use of powder pyrolysis of metalorganic precursors. It is more specifically possible to use an intermediate coating based on oxides of aluminium and titanium or tin, preferably obtained by liquid pyrolysis of metalorganic precursors, as proposed in EP-A-465 309. Preferably, the geometrical thickness of this covering is between 90 and 120 nm.

The functional coating is advantageously based on doped metal oxide or oxides, belonging to the group including tin-doped indium oxide (ITO), zinc oxide doped with indium ZnO:In, with fluorine ZnO:F, with aluminium ZnO:Al or tin ZnO:Sn, as well as fluorine-doped tin oxide $SnO_2$:F, the latter oxide constituting the preferred embodiment of the invention.

This coating can also be produced with the aid of the pyrolysis method, particularly using pulverulent compounds, especially when the coating is of $SnO_2$:F or ITO.

It is possible to produce the $SnO_2$:F coatings from dibutyl tin oxide (DBTO) in powder form and gaseous, anhydrous hydrofluoric acid, as described in FR-A-2 380 997 and based on dibutyl tin difluoride (DBTF), optionally mixed with DBTO, as described in EP-A-178 956 or EP-A-39 256.

With respect to the ITO coatings, they can e.g. be obtained from indium formate and a tin compound such as DBTO, described in EP-A-192 009.

It is also possible to obtain the $SnO_2$:F coatings by gaseous phase pyrolysis, particularly from a mixture of tin compounds such as $(CH_3)_2SnCl_2$, $(C_4H_9)_2SnCl_2$, $Sn(C_2H_5)_4$ and organofluorine compounds such as $CCl_2F_2$, $CHClF_2$ $CH_3CHF_2$, as described in EP-A-27 403, or from monobutyl trichloro tin and a compound such as chlorodifluoromethane mentioned in EP-A-121 459.

The $SnO_2$:F coatings can also be obtained in the liquid phase from tin acetyl acetonate or dimethyl tin-2-propionate in appropriate organic solvents, as described in FR-A-2 211 411.

The aluminium or indium-doped zinc oxide coatings can be obtained by vapour phase pyrolysis from diethyl zinc or zinc acetate and triethyl indium, indium chloride or triethyl aluminium, aluminium chloride, as described in EP-A-385 769.

The outer covering is preferably chosen in such a way that its geometrical thickness is between 80 and 100 nm and in particular approximately 90 to 95 nm.

As stated hereinbefore, the recommended refractive index range for this covering extends between 1.40 and 1.70. Within said range it is possible to choose for the formation of the covering, silicon compounds such as silicon dioxide $SiO_2$, or silicon oxynitrides or oxycarbides. Silicon dioxide has a refractive index of approximately 1.45, whereas the oxycarbides have a higher index, which can be controlled by modifying the carbon content of the covering.

Preference may also be given to metal oxide-based or metal oxide mixture-based coverings, e.g. chosen from among aluminium oxide, titanium oxide, zirconium oxide or chromium oxide.

In the first case, it is possible to obtain the covering more particularly by using the aforementioned CVD methods for producing the inner covering.

It is also possible to employ a CVD method using as precursors organosilicon compounds associated with an oxidizing gas such as oxygen (or any other gas which is less strongly oxidizing such as $H_2O$ or $N_2O$) in an inert, diluting gas of the nitrogen type. As appropriate organosilicon compounds reference can be made to diethyl silane $Si(CH_3)_2H_2$, hexamethyl disilane $(CH_3)_3Si—Si(CH_3)_3$, tetraethyl orthosilicate $Si(OC_2H_5)_4$, hexamethyl disilaxane $(CH_3)_3—Si—O—Si(CH_3)_3$, octamethyl cyclotetrasiloxane $((CH_3)_2SiO)_4$, tetramethyl cyclotetrasiloxane $(CH_3HSiO)_4$, as well as hexamethyl disilazane or tetramethyl silane.

No matter what the silicon precursor type which is envisaged, it is possible to control the carbon content of the coating by adjusting the relative proportion of the different precursor compounds thereof.

In the second case it is possible to obtain the metal oxide covering by the powder pyrolyric deposition of appropriate metalorganic precursors, as described in European patent application EP-500 445 and French patent application 93-02 136 filed on 25.2.1993 and the teaching of said applications is incorporated into the present application. The interest of using the deposition device described in the aforementioned French application is that it is possible to consecutively and easily deposit the functional coating and then the outer covering.

By choosing for the outer covering a varying refractive index within the range 1.4 to 1.7 in fact represents a compromise. It has been found that for the same optical thickness, a higher index improves the physicochemical behaviour of the stack, whereas a lower index improves the optical performance characteristics, particularly by optimizing its anti-reflecting appearance. (It is pointed out that the optical thickness is the product of the geometrical thickness by the refractive index of a given coating). The selection of the index of the external covering thus makes it possible to give preference to a specific property, as a function of the intended use of the glazing carrying the stack.

A variant of the invention consists of incorporating the thus covered substrate into a double glazing so that, once installed, the coatings are in face 3. It is then advantageously possible to deposit in face 2, i.e. on the other transparent substrate separated from the first by a tongue of gas, an additional covering, in particular having a low refractive index. It can e.g. be a silicon dioxide-based covering, which can then contribute to lowering the light reflection value $R_L$ of said glazing.

Any deposition procedure can be used for depositing the functional coating and its covering. In particular, at least one of the coatings, when it is metal oxide based can be deposited by a procedure using vacuum, particularly cathodic sputtering, which may be reactive and in the presence of oxygen, using targets of metal alloy or ceramics of appropriate compositions.

However, preference is given with respect to the deposition of at least one of the coatings to a solid, liquid or gaseous pyrolysis procedure, because this permits a continuous deposition on a ribbon of glass.

Thus, in a preferred embodiment for obtaining the stack according to the invention, the first deposition of the inner covering takes place by CVD on the ribbon of glass in the float enclosure, followed by the deposition of the functional coating by pyrolysis, particularly of pulverulent compounds, between the float enclosure and the lehr, followed by the deposition of the outer covering, either by CVD upstream of the lehr or in the latter, or by powder pyrolysis just after the deposition of the functional coating.

Other advantageous features and details of the invention can be gathered from the following description of non-limitative examples, with the aid of the single drawing in the form of FIG. 1, which is a cross-section of a substrate coated in accordance with the invention.

In order to perform the invention, and in accordance with the following examples, it was necessary to adjust the characteristics of the inner covering 2 and the outer covering 4 as a function of the thickness of the functional coating 3, in order to obtain the desired dominant wavelength and residual colour.

EXAMPLES 1 TO 6

The following examples 1 to 6 relate to a 4 mm thick, soda-lime-silica, clear glass substrate 1, coated by an inner covering 2 based on silicon, oxygen and carbon and obtained by CVD according to the teaching of French application FR-A-2 677 639, a functional coating 3 of $SNO_2$:F obtained in known manner by powder pyrolysis from DBTF as described in the aforementioned patents and an outer covering 4 based on silicon dioxide obtained by CVD in known manner.

It is pointed out that the representation of FIG. 1 is highly diagrammatic and does not respect the relative proportions of the thicknesses of the materials 1, 2, 3 and 4 for reasons of clarity. All the spectrophotometric measurements were made with reference to the illuminant for light $D_{65}$.

The abbreviations used in the following tables 1 to 3, which summarize the characteristics in light reflection of the examples have the following meanings: $R_L(\%)$ light reflection as a percentage; pe excitation purity as a percentage measured under normal incidence; lambda the dominant wavelength in nanometers in the chromaticity diagram (x,y); $c^*$ the saturation with $c^*=\sqrt{*2+b^{*2}}$ in the colorimetry system ($L^*,a^*,b^*$); and CR the residual colour in reflection on the "coating side". It is pointed out that these values correspond to those measured for a double glazing having the substrate 1 covered by the stack 2, 3, 4 in face 3 and separated by a 12 mm layer of air from a bare substrate, identical to substrate 1.

Example 1 is given for comparison purposes.

EXAMPLE 1

The inner covering 2 has a geometrical thickness of 100 nm and a refractive index of 1.70. The functional coating 3 has a geometrical thickness of 360 nm. The outer, $SiO_2$ covering has a refractive index of 1.45 and a physical thickness of 65 nm.

The following examples 2 to 5 are according to the invention.

EXAMPLE 2

The inner covering 2 has a geometrical thickness of 115 nm and a refractive index of 1.90. The functional coating 3 has a geometrical thickness of approximately 350 nm. The outer, $SiO_2$ covering has a refractive index of approximately 1.45 and a geometrical thickness of approximately 90 nm.

EXAMPLE 3

The inner covering 2 has a geometrical thickness of 110 nm and a refractive index of 1.77. The functional coating 3 has a geometrical thickness of approximately 375 nm. The outer, SiO$_2$ covering 4 has a refractive index of approximately 1.45 and a geometrical thickness of approximately 93 nm. The emissivity is 0.17.

EXAMPLE 4

The inner covering 2 has a geometrical thickness of 130 nm and a refractive index of 1.67. The functional coating 3 has a thickness of approximately 352 nm. The outer, SiO$_2$ covering 4 has a geometrical thickness of approximately 93 nm and a refractive index of approximately 1.45. The emissivity is 0.18.

EXAMPLE 5

The inner covering 2 has a geometrical thickness of 85 nm and a refractive index of 1.70. The functional coating 3 has a thickness of 360 nm. The outer, SiO$_2$ covering 4 has a refractive index of 1.45 and a geometrical thickness of approximately 100 nm.

TABLE 1

| Example | R$_L$ | Pe | Lambda | C* | CR |
| --- | --- | --- | --- | --- | --- |
| 1 | 12.9 | 4.8 | 564 | — | red |
| 2 | 13.8 | 4 | 475 | 2.9 | blue |
| 3 | 13.2 | 4 | 477 | 2.9 | blue |
| 4 | 13.3 | 5 | 478 | 3.3 | blue |
| 5 | 11.7 | 5.8 | 477 | — | blue |

It can be gathered from a comparison of example 1 and the following examples that it is necessary for the purpose of obtaining the desired blue colour in reflection to adopt characteristics, particularly with regards to the thicknesses, for both the inner and outer coverings selected very carefully in accordance with the present invention. In addition, examples 2 to 4 have not very high values for R$_L$, Pe and c*, with R$_L$ approximately 15% and saturations c* below 5 in double glazing.

The reflection appearance of the glazings is therefore highly esthetic, because it is very pale, anti-reflecting and agreeable to the eye and is not to the detriment of the performance characteristics of the glazing, which retains satisfactory emissivity values.

EXAMPLE 6

The inner covering 2 has a geometrical thickness of 110 nm and a refractive index of 1.75. The functional coating 3 has a geometrical thickness of approximately 360 nm and the outer, SiO$_2$ covering 4 a geometrical thickness of approximately 93 nm.

The following table 2 groups certain already explained, photometric values of the covered substrate fitted in a double glazing, but on this occasion with a measurement angle alpha of these values varying from 0° (normal incidence) to 40°.

TABLE 2

| Alpha | R$_L$ | Lambda | Pe | CR |
| --- | --- | --- | --- | --- |
| 0° | 12.4 | 476 | 5.4 | blue |
| 20° | 12.5 | 476 | 5.3 | blue |

TABLE 2-continued

| Alpha | R$_L$ | Lambda | Pe | CR |
| --- | --- | --- | --- | --- |
| 40° | 13.6 | 430 | 3.5 | blue |

This table shows that even when the measurement angle varies very significantly, the appearance in reflection remains very stable, particularly in the blue range. This advantageously means that a facade, e.g. of a building, equipped with such glazings, will have a very uniform appearance viewed from the outside, no matter what the angle of vision.

EXAMPLES 7 AND 8

Examples 7 and 8 are similar to the previous examples, except that they do not use the outer SiO$_2$ covering, but instead an outer covering of the type Si, O, C with a slightly higher index. This covering can be obtained by CVD either using the same procedure and the same precursors as for the inner covering (i.e. in particular SiH$_4$ and ethylene) or by CVD with metalorganic precursors of the hexamethyl disilane or tetramethyl silane type combined with "gentle" oxidizers of the N$_2$O or H$_2$O type. In both cases, the desired index is obtained by an appropriate selection of the proportions of the different constituent precursors of the projected reactive gas.

EXAMPLE 7

The inner covering 2 has a geometrical thickness of 95 nm and a refractive index of 1.70. The functional coating 3 has a geometrical thickness of 360 nm. The outer covering 4 has a geometrical thickness of 88 nm and a refractive index of 1.65.

EXAMPLE 8

The inner covering 2 has a geometrical thickness of 90 nm and a refractive index of 1.65. The characteristics of the functional coating and the outer covering are as in example 6.

The following table 3 indicates the optical characteristics relative to these two examples, measured in the same way as for examples 1 to 5 in table 1 (same fitting in double glazing).

TABLE 3

| Example | R$_L$ | Lambda | Pe | CR |
| --- | --- | --- | --- | --- |
| 7 | 13 | 470 | 3.9 | blue |
| 8 | 13.1 | 471 | 4.3 | blue |

The optical performance characteristics of the two stacks are consequently satisfactory, even though the value of R$_L$ is slightly higher than that obtained with the stacks of the previous examples. However, it was found that these two stacks had a superior physicochemical behaviour and durability, which is very advantageous.

We claim:

1. A glazing comprising a transparent glass substrate (1) provided with a transparent, and conducting and/or low emissive functional coating (3) based on one or more metal oxides, said functional coating (3) having an inner face and an outer face and a refractive index of about 2 and a thickness between 300 and 450 nm, an "inner" coating layer (2) with a geometrical thickness between 70 and 135 nm and a refractive index between 1.65 and 1.90 and positioned between an inner face of the functional coating (3) and the substrate (1) and an "outer" coating layer (4) with a geometrical thickness between 70 and 110 nm and a refractive index between 1.40 and 1.70 and which is located on an outer face of the functional coating (3), and wherein said glazing, when combined with another transparent substrate to form a double glazing, the substrate (1) provided with its coatings (2, 3 and 4), has a reflection color on the coating side, whose saturation is below 5 and whose dominant wavelength between 465 and 480 nm belongs to the blue range, and whose light reflection value $R_L$ is equal to or below 15%.

2. A glazing according to claim 1, wherein the outer coating layer (4) has a geometrical thickness between 80 and 100 nm.

3. A glazing according to claim 1, wherein the inner coating layer (2) has a geometrical thickness between 90 and 120 nm.

4. A glazing according to claim 1, wherein the functional coating (3) has at least one doped metal oxide selected from the group consisting of tin-doped indium oxide, zinc oxide doped with indium, zinc oxide doped with fluorine, zinc oxide doped with aluminum, zinc oxide doped with tin, and fluorine-doped tin oxide.

5. A glazing according to claim 1, wherein the inner coating layer (2) is constituted by at least one of the metal oxides selected from the group consisting of titanium, aluminum, zinc, tin and indium oxide.

6. A glazing according to claim 1, wherein the inner coating layer (2) is formed by a silicon oxycarbide and/or oxynitride.

7. A glazing according to claim 1, wherein the outer coating layer (4) is silicon dioxide, oxycarbide and/or oxynitride.

8. A glazing according to claim 1, wherein the outer coating layer (4) is at least one of the metal oxides selected from the group consisting of aluminum, titanium, zirconium and chromium oxides.

9. A glazing according to claim 1, combined with another transparent substrate to form a double glazing.

10. A glazing according to claim 9, wherein said coatings (2, 3, 4) are in Face 3 and the other substrate is glass and optionally coated in face 2 with a coating having a low refractive index.

* * * * *